(12) United States Patent
Daniel et al.

(10) Patent No.: US 9,603,155 B2
(45) Date of Patent: Mar. 21, 2017

(54) REDUCING LEAKED DOWNLINK INTERFERENCE SIGNALS IN A REMOTE UNIT UPLINK PATH(S) IN A DISTRIBUTED ANTENNA SYSTEM (DAS)

(71) Applicant: CORNING OPTICAL COMMUNICATIONS WIRELESS LTD, Airport City (IL)

(72) Inventors: Liav Moshe Daniel, Gedera (IL); Maor Saig, Shaarey-Tikva (IL); Motti Yakobi, Beer-tuvia (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 0 days.

(21) Appl. No.: 14/815,138

(22) Filed: Jul. 31, 2015

(65) Prior Publication Data
US 2017/0034833 A1    Feb. 2, 2017

(51) Int. Cl.
| H04B 10/00 | (2013.01) |
| H04W 72/08 | (2009.01) |
| H04W 72/04 | (2009.01) |
| H04B 10/2575 | (2013.01) |

(52) U.S. Cl.
CPC .... *H04W 72/082* (2013.01); *H04B 10/25753* (2013.01); *H04W 72/0413* (2013.01)

(58) Field of Classification Search
USPC .................................................. 398/115–117
See application file for complete search history.

(56) References Cited

U.S. PATENT DOCUMENTS

| 5,699,176 A * | 12/1997 | Cohen ................ G02B 6/12007 398/116 |
| RE35,736 E * | 2/1998 | Powell ................. H01Q 3/2676 343/853 |
| 6,359,714 B1 * | 3/2002 | Imajo ............... H04B 10/25754 398/178 |
| 6,751,447 B1 * | 6/2004 | Jin ........................ H03F 1/3252 330/136 |
| 7,809,047 B2 * | 10/2010 | Kummetz .......... H04B 7/15585 375/211 |
| 8,331,509 B2 * | 12/2012 | Wang ..................... H04B 1/126 327/551 |
| 9,106,453 B2 * | 8/2015 | Wang ...................... H03F 1/304 |
| 9,253,003 B1 * | 2/2016 | Harel ................ H04L 25/03006 |

(Continued)

*Primary Examiner* — Agustin Bello
(74) *Attorney, Agent, or Firm* — C. Keith Montgomery

(57) ABSTRACT

Methods and systems for reducing leaked downlink interference signals in a remote unit uplink path(s) in a distributed antenna system (DAS) are provided. In a remote antenna unit (RAU) disclosed herein, a downlink interference signal may be leaked from a downlink path to an uplink path in the RAU. In this regard, an adjustment circuit is provided in the downlink path of the RAU to suppress the downlink interference signal. A control system is provided in the DAS to monitor the leaked downlink interference signal and control the adjustment circuit in the RAU to minimize the leaked downlink interference signal in the uplink path. By providing the adjustment circuit in the RAU and the control system in the DAS to minimize the leaked downlink interference signal in the uplink path, it is possible to reduce interferences between downlink and uplink communications signals without increasing costs of the RAU.

25 Claims, 6 Drawing Sheets

(56) References Cited

U.S. PATENT DOCUMENTS

| | | | |
|---|---|---|---|
| 9,258,052 B2* | 2/2016 | George | H04B 7/0413 |
| 2001/0040932 A1* | 11/2001 | Lindquist | H04B 15/04 |
| | | | 375/346 |
| 2002/0072344 A1* | 6/2002 | Souissi | H04B 1/123 |
| | | | 455/296 |
| 2002/0193071 A1* | 12/2002 | Waltho | H04B 1/525 |
| | | | 455/24 |
| 2003/0161637 A1* | 8/2003 | Yamamoto | H04J 14/025 |
| | | | 398/167.5 |
| 2003/0198475 A1* | 10/2003 | Tiemann | H04B 10/25755 |
| | | | 398/141 |
| 2004/0151238 A1* | 8/2004 | Masenten | H04B 1/525 |
| | | | 375/219 |
| 2004/0218562 A1 | 11/2004 | Orava et al. | |
| 2005/0107051 A1* | 5/2005 | Aparin | H04B 1/525 |
| | | | 455/126 |
| 2005/0244166 A1* | 11/2005 | Shinagawa | G06F 1/163 |
| | | | 398/186 |
| 2007/0133995 A1* | 6/2007 | Lee | H04B 10/25758 |
| | | | 398/115 |
| 2008/0039045 A1* | 2/2008 | Filipovic | H04B 1/109 |
| | | | 455/295 |
| 2008/0089397 A1* | 4/2008 | Vetter | H04L 27/366 |
| | | | 375/220 |
| 2009/0238573 A1* | 9/2009 | Bauman | H04B 10/25756 |
| | | | 398/115 |
| 2010/0048146 A1* | 2/2010 | McCallister | H04B 1/525 |
| | | | 455/78 |
| 2010/0166109 A1* | 7/2010 | Neumann | H03F 1/3247 |
| | | | 375/296 |
| 2010/0197231 A1* | 8/2010 | Kenington | H04B 1/525 |
| | | | 455/63.1 |
| 2011/0158081 A1* | 6/2011 | Wang | H03F 1/304 |
| | | | 370/201 |
| 2011/0228828 A1* | 9/2011 | Wang | H04B 1/126 |
| | | | 375/219 |
| 2012/0262234 A1 | 10/2012 | Lee et al. | |
| 2012/0329523 A1* | 12/2012 | Stewart | H03F 1/3247 |
| | | | 455/562.1 |
| 2013/0295980 A1 | 11/2013 | Reuven et al. | |
| 2014/0036770 A1 | 2/2014 | Stapleton et al. | |
| 2014/0162712 A1 | 6/2014 | Feld et al. | |
| 2014/0178064 A1* | 6/2014 | Hino | H04J 1/12 |
| | | | 398/41 |
| 2015/0195055 A1 | 7/2015 | Ben-Shlomo | |
| 2015/0282105 A1 | 10/2015 | Harel | |
| 2016/0127027 A1* | 5/2016 | Ling | H04B 17/0085 |
| | | | 398/115 |

* cited by examiner

REDUCING LEAKED DOWNLINK INTERFERENCE SIGNALS IN A REMOTE UNIT UPLINK PATH(S) IN A DISTRIBUTED ANTENNA SYSTEM (DAS)

BACKGROUND

The disclosure relates generally to distribution of communications signals in a distributed antenna system (DAS) and, more particularly, to reducing leaked downlink interference signals in an uplink path(s) in the DAS resulting from downlink and uplink communications in a remote unit.

Wireless customers are increasingly demanding digital data services, such as streaming video signals. Concurrently, some wireless customers use their wireless devices in areas that are poorly serviced by conventional cellular networks, such as inside certain buildings or areas where there is little cellular coverage. One response to the intersection of these two concerns has been the use of DASs. DASs can be particularly useful when deployed inside buildings or other indoor environments where client devices may not otherwise be able to effectively receive radio frequency (RF) signals from a source. DASs include remote antenna units (RAUs) configured to receive and transmit communications signals to client devices within the antenna range of the RAUs.

A typical DAS comprises head-end equipment (HEE) communicatively coupled to a plurality of remote units. If the remote units include antennas to support transmission and reception of wireless communications signals, the remote units may be referred to as RAUs. The HEE is typically communicatively coupled to a cellular base station. The HEE is configured to distribute received downlink communications signals from the cellular base station to the RAUs. The RAUs are configured to distribute received uplink communications signals received from client devices to the HEE to be provided to the cellular base station. The HEE is configured to receive and support a variety of wireless communications services for distribution to the RAUs, such as wideband code division multiple access (WCDMA), long term evolution (LTE), and wireless local area network (WLAN) communications services as examples. To distribute the wireless communications services in the DAS, the wireless communications services can be provided in the form of analog RF communications signals and/or digital communications signals to the HEE of the DAS for distribution to the RAUs.

An RAU in the DAS may be configured to support more than one type of wireless communications service that operates in a variety of RF spectrums and bandwidths. Downlink wireless communications signals received by the RAU are typically amplified by a signal amplifier to increase signal strength before being distributed to the client devices through one or more coupled antennas. However, the amplified downlink communications signals may include intermodulation products. For instance, if two (2) downlink wireless communications signals operating on an 869 MHz band and an 894 MHz band are amplified by the signal amplifier, intermodulation products may be generated below the 869 MHz band (e.g., 844 MHz, 819 MHz, 794 MHz, and so on) and above the 894 MHz band (e.g., 919 MHz, 944 MHz, 969 MHz, and so on). The intermodulation products should be sufficiently isolated to prevent or reduce interferences on adjacent wireless communication channels.

No admission is made that any reference cited herein constitutes prior art. Applicant expressly reserves the right to challenge the accuracy and pertinency of any cited documents.

SUMMARY

Embodiments of the disclosure relate to reducing leaked downlink interference signals in a remote unit uplink path(s) in a distributed antenna system (DAS). In the exemplary DAS disclosed herein, a plurality of remote units is provided. In a non-limiting example, the plurality of remote units may be a plurality of remote antenna units (RAUs). The plurality of RAUs are each configured to receive downlink wireless communications signals in a downlink path and distribute the downlink communications signals to client devices through a coupled antenna. The RAUs are also each configured to receive uplink communications signals from the client devices through the coupled antenna and distribute the uplink wireless communications signals in an uplink path. At least one downlink interference signal may be generated when, for example, a non-linear signal amplifier in a RAU amplifies the downlink communications signals in its downlink path. The downlink interference signal may be leaked from its downlink path to its uplink path, thus interfering with the uplink communications signals on the uplink path. In this regard, in one aspect, an adjustment circuit is provided in the downlink path of at least one RAU in the DAS to suppress a downlink interference signal. An interference control system is provided in the DAS outside of the RAUs to monitor the leaked downlink interference signal in the uplink path of the at least one RAU and control the adjustment circuit in the at least one RAU to minimize the leaked downlink interference signal in the uplink path. By providing the interference control system in the DAS outside of the RAUs to control the adjustment circuit(s) in the RAU(s) to minimize leaked downlink interference signals in an uplink path of RAU(s) in the DAS, interferences between the downlink communications signals and the uplink communications signals can be reduced without the need to provide interference control systems in each RAU. Providing an interference control system in each RAU may increase the cost of the RAU in an undesired manner.

One embodiment of the disclosure relates to a DAS. The DAS comprises a head-end equipment (HEE) communicatively coupled to a plurality of RAUs over at least one downlink communications medium and at least one uplink communications medium. At least one RAU among the plurality of RAUs comprises a coupling device coupled to a downlink path configured to carry a downlink signal and an uplink path configured to carry an uplink signal. The coupling device is configured to receive the downlink signal from the downlink path and provide the downlink signal to an antenna. The downlink signal comprises at least one downlink communications signal and at least one downlink interference signal. The coupling device is also configured to provide the uplink signal to the uplink path. The uplink signal comprises an uplink communications signal received from the antenna and the at least one downlink interference signal leaked from the downlink path to the uplink path. The DAS also comprises an interference control system communicatively coupled to the at least one RAU among the plurality of RAUs. The interference control system is configured to provide the at least one downlink communications signal to the at least one RAU over the at least one downlink communications medium. The interference control system is also configured to receive the uplink signal from the at least one RAU over the at least one uplink communications medium. The interference control system is also configured to measure signal strength of the at least one downlink interference signal comprised in the uplink signal. The interference control system is also configured to generate and provide an adjustment control signal to an adjustment circuit in the at least one RAU to reduce the at least one downlink interference signal in the uplink signal to a minimal level based on the measured signal strength of the at least one downlink interference signal.

An additional embodiment of the disclosure relates to a method for reducing leaked downlink interference signals in an RAU uplink path in a DAS. The method comprises providing at least one downlink communications signal to a downlink path in at least one RAU in a DAS. The method also comprises receiving an uplink signal from the at least one RAU. The uplink signal comprises at least one downlink interference signal leaked from the downlink path to an uplink path of the at least one RAU. The method also comprises measuring signal strength of at least one downlink interference signal comprised in the uplink signal. The method also comprises providing an adjustment control signal to the at least one RAU to minimize the at least one downlink interference signal in the uplink signal based on the measured signal strength of the at least one downlink interference signal.

An additional embodiment of the disclosure relates to an HEE in a DAS. The HEE comprises a signal generator coupled to at least one RAU among a plurality of RAUs in a DAS over at least one downlink communications medium. The signal generator is configured to generate and distribute at least one downlink communications signal to a downlink path in the at least one RAU over the at least one downlink communications medium. The HEE also comprises a spectrum analyzer coupled to the at least one RAU over at least one uplink communications medium. The spectrum analyzer is configured to receive an uplink signal from an uplink path in the at least one RAU over the at least one uplink communications medium. The uplink signal comprises at least one downlink interference signal leaked from the downlink path to the uplink path in the at least one RAU. The spectrum analyzer is also configured to measure signal strength of the at least one downlink interference signal comprised in the uplink signal. The spectrum analyzer is also configured to provide the measured signal strength of the at least one downlink interference signal to a process controller that is communicatively coupled to the spectrum analyzer and the signal generator. The process controller is configured to provide an adjustment control signal to the at least one RAU to minimize the at least one downlink interference signal in the uplink signal based on the measured signal strength of the at least one downlink interference signal.

An additional embodiment of the disclosure relates to an RAU in a DAS. The RAU comprises a coupling device coupled to a downlink path and an uplink path. The coupling device is configured to receive a downlink signal from the downlink path and provide the downlink signal to an antenna. The downlink signal comprises at least one downlink communications signal and at least one downlink interference signal. The coupling device is also configured to provide an uplink signal to the uplink path. The uplink signal comprises an uplink communications signal received from the antenna and the at least one downlink interference signal leaked from the downlink path to the uplink path. The RAU also comprises an adjustment circuit comprising a local controller communicatively coupled to a process controller in an interference reduction control system. The local controller is configured to suppress the at least one downlink interference signal in the downlink signal based on an adjustment control signal received from the interference reduction control system that is communicatively coupled to the adjustment circuit.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiments, and together with the description serve to explain principles and operation of the various embodiments.

DETAILED DESCRIPTION

Embodiments of the disclosure relate to reducing leaked downlink interference signals in a remote unit uplink path(s) in a distributed antenna system (DAS). In the exemplary DAS disclosed herein, a plurality of remote units is provided. In a non-limiting example, the plurality of remote units may be a plurality of remote antenna units (RAUs). The plurality of RAUs are each configured to receive downlink wireless communications signals in a downlink path and distribute the downlink communications signals to client devices through a coupled antenna. The RAUs are also each configured to receive uplink communications signals from the client devices through the coupled antenna and distribute the uplink wireless communications signals in an uplink path. At least one downlink interference signal may be generated when, for example, a non-linear signal amplifier in a RAU amplifies the downlink communications signals in its downlink path. The downlink interference signal may be leaked from its downlink path to its uplink path, thus interfering with the uplink communications signals on the uplink path. In this regard, in one aspect, an adjustment circuit is provided in the downlink path of at least one RAU in the DAS to suppress a downlink interference signal. An interference control system is provided in the DAS outside of the RAUs to monitor the leaked downlink interference signal in the uplink path of the at least one RAU and control the adjustment circuit in the at least one RAU to minimize the leaked downlink interference signal in the uplink path. By providing the interference control system in the DAS outside of the RAUs to control the adjustment circuit(s) in the RAUs(s) to minimize leaked downlink interference signals in an uplink path of RAU(s) in the DAS, interferences between the downlink communications signals and the uplink communications signals can be reduced without the need to provide interference control systems in each RAU. Providing an interference control system in each RAU may increase the cost of the RAU in an undesired manner.

Figure 1:
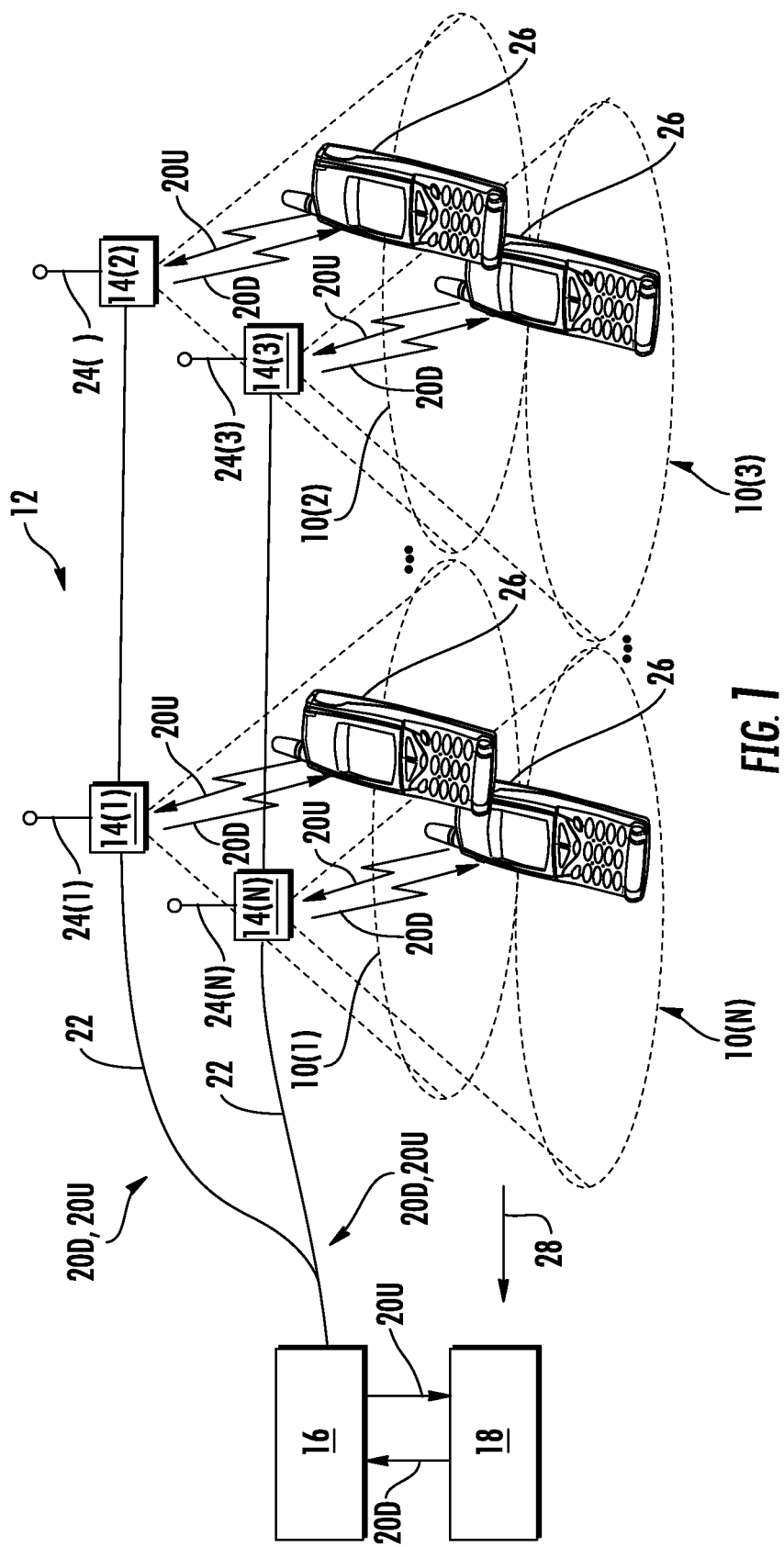
FIG. 1 is a schematic diagram of an exemplary distributed antenna system (DAS)
Figure 2:
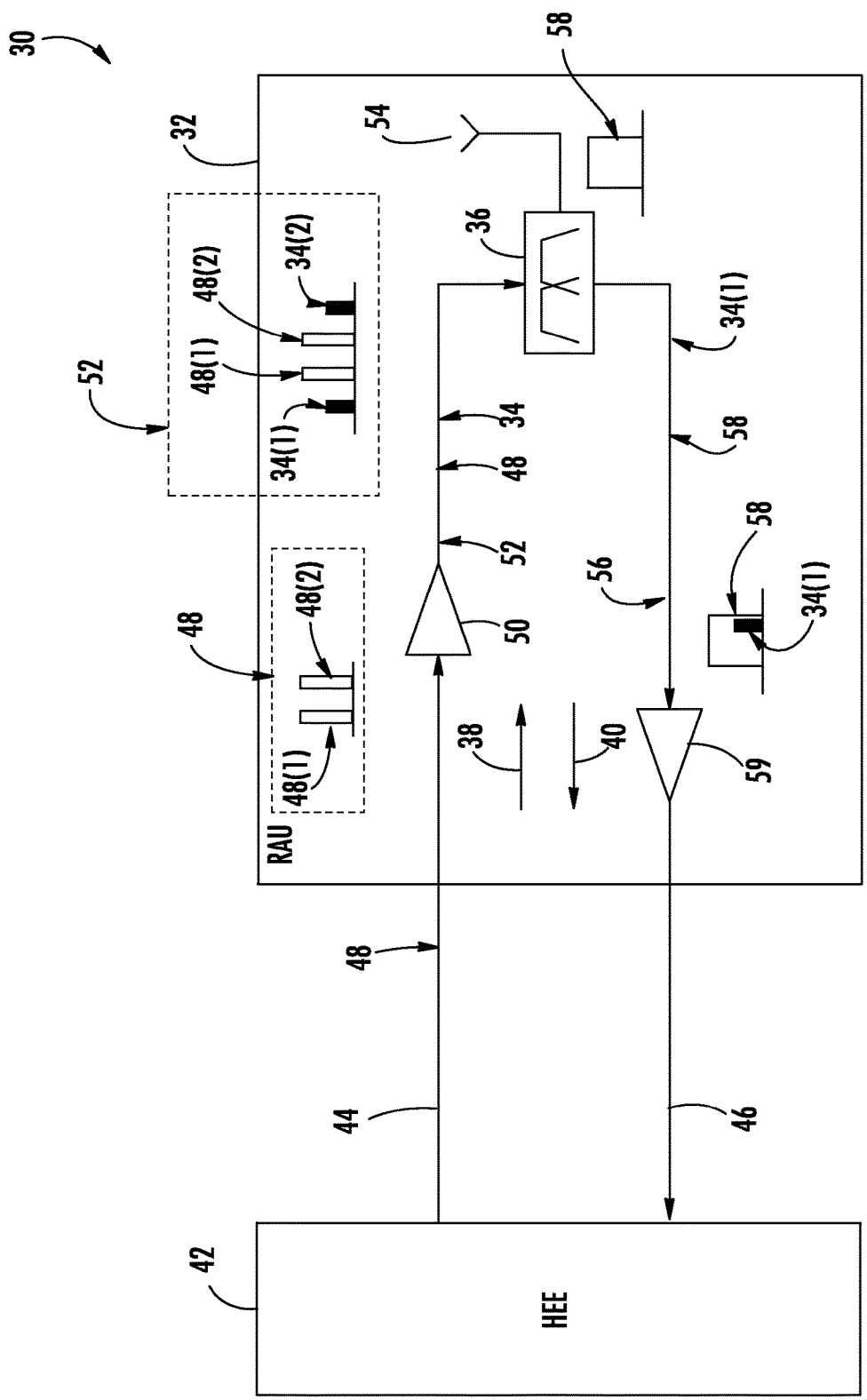
FIG. 2 is a schematic diagram of an exemplary DAS illustrating one RAU among a plurality of RAUs, wherein at least one downlink interference signal in the RAU is leaked by a coupling device from a downlink path to an uplink path.

Before discussing examples of reducing leaked downlink interference signals in an RAU uplink path in a DAS starting at FIG. 2, a discussion of an exemplary DAS that employs a communications medium to support wireless communications services to a plurality of RAUs that does not include reduction of leaked downlink interference signals in RAU uplink paths is first provided with reference to FIG. 1.

In this regard, FIG. 1 illustrates distribution of communications services to coverage areas 10(1)-10(N) of a DAS 12, wherein 'N' is the number of coverage areas. These communications services can include cellular services, wireless services, such as radio frequency (RF) identification (RFID) tracking, Wireless Fidelity (Wi-Fi), local area network (LAN), and wireless LAN (WLAN), and combinations thereof, as examples. The coverage areas 10(1)-10(N) may be remotely located. In this regard, the coverage areas 10(1)-10(N) are created by and centered on RAUs 14(1)-14(N) connected to a head-end equipment (HEE) 16 (e.g., a head-end controller, a head-end unit, or a central unit). The HEE 16 may be communicatively coupled to a signal source 18, for example, a base transceiver station (BTS) or a baseband unit (BBU). In this regard, the HEE 16 receives downlink communications signals 20D from the signal source 18 to be distributed to the RAUs 14(1)-14(N). The RAUs 14(1)-14(N) are configured to receive the downlink communications signals 20D from the HEE 16 over a communications medium 22 to be distributed to the respective coverage areas 10(1)-10(N) of the RAUs 14(1)-14(N). In a non-limiting example, the communications medium 22 may be a wired communications medium (e.g., a coaxial cable or a category 5/6/7 cable), a wireless communications medium, or an optical fiber-based communications medium. Each of the RAUs 14(1)-14(N) may include an RF transmitter/receiver (not shown) and a respective antenna 24(1)-24(N) operably connected to the RF transmitter/receiver to wirelessly distribute communications services to client devices 26 within the respective coverage areas 10(1)-10(N). The RAUs 14(1)-14(N) are also configured to receive uplink communications signals 20U from the client devices 26 in the respective coverage areas 10(1)-10(N) to be distributed to the signal source 18. The size of a given coverage area of the coverage areas 10(1)-10(N) is determined by an amount of RF power transmitted by the respective RAUs 14(1)-14(N), receiver sensitivity, antenna gain, and RF environment, as well as by RF transmitter/receiver sensitivity of the client devices 26. The client devices 26 usually have a fixed maximum RF receiver sensitivity, so that the above-mentioned properties of the RAUs 14(1)-14(N) mainly determine the size of the respective coverage areas 10(1)-10(N).

With continuing reference to FIG. 1, the RF transmitter/receiver in each of the RAUs 14(1)-14(N) may be connected to the respective antenna 24(1)-24(N) through a coupling device (not shown), as opposed to connecting to the respective antenna 24(1)-24(N) over completely isolated antenna transmit/receive paths. As such, the coupling device is configured to alternate between transmitting the downlink communications signals 20D to the respective antenna 24(1)-24(N) and receiving the uplink communications signals 20U from the respective antenna 24(1)-24(N). Because the downlink communications signals 20D may be associated with downlink interference signals (e.g., intermodulation products), the downlink interference signals may be leaked by the coupling device into an uplink path 28, thus degrading the uplink communications signals 20U.

In this regard, FIG. 2 is a schematic diagram of an exemplary DAS 30 comprising a plurality of RAUs 32. Only one RAU 32 is shown in FIG. 2, but note that the features of the RAU 32 shown in FIG. 2 can be provided in any of a plurality of RAUs in the DAS 30. In the RAU 32 in FIG. 2, as discussed in more detail below, at least one downlink interference signal 34 is leaked by a coupling device 36 from a downlink path 38 to an uplink path 40 in the RAU 32. In a non-limiting example, the coupling device 36 may be a duplexer, a multiplexer, a hybrid combiner, or a combination thereof. The RAU 32 is communicatively coupled to an HEE 42 over at least one downlink communications medium 44 and at least one uplink communications medium 46. The RAU 32 receives at least one downlink communications signal 48. In a non-limiting example, the downlink communications signal 48 may be received from one or more signal sources (not shown), such as a cellular base station for example.

With continuing reference to FIG. 2, at least one downlink signal amplifier 50 is provided in the downlink path 38 before the coupling device 36 to increase signal strength of the downlink communications signal 48, which comprises the first downlink signal 48(1) and the second downlink signal 48(2) in this example. Due to non-linearities of the downlink signal amplifier 50, intermodulation distortion (IMD) products may be generated when the downlink communications signal 48 is amplified. As a result, a downlink signal 52 output by the downlink signal amplifier 50 may comprise the downlink interference signal 34 in addition to the downlink communications signal 48. In a non-limiting example, when the downlink communications signal 48 occupying the 1930 MHz-1950 MHz band is amplified by the downlink signal amplifier 50, a pair of third order IMD products 34(1) and 34(2) are generated at nineteen hundred and ten megahertz (1910 MHz) and nineteen hundred and seventy megahertz (1970 MHz), respectively. In this regard, the downlink interference signal 34 comprises the pair of third order IMD products 34(1) and 34(2).

With continuing reference to FIG. 2, the coupling device 36 receives the downlink signal 52, which comprises the downlink communications signal 48 and the downlink interference signal 34, and provides the downlink signal 52 to an antenna 54 for distribution to one or more client devices (not shown). The coupling device 36 also provides an uplink signal 56, which comprises an uplink communications signal 58 received from the one or more client devices through the antenna 54, to the uplink path 40 for distribution to the HEE 42 over the uplink communications medium 46. The uplink signal 56 is amplified by an uplink signal amplifier 59 and then provided to the HEE 42 over the uplink communications medium 46. In a non-limiting example, the uplink signal 56 may occupy an eighteen hundred and fifty megahertz (1850 MHz) to nineteen hundred and fifteen megahertz (1915 MHz) band. However, if the coupling device 36 is unable to sufficiently isolate the downlink path 38 from the uplink path 40, the downlink interference signal 34 may be leaked from the downlink path 38 to the uplink path 40. For example, the third order IMD product 34(1), which occupies the 1910 MHz frequency, will fall into the 1850 MHz-1915 MHz band used by the uplink signal 56, thus degrading the uplink signal 56.

With continuing reference to FIG. 2, one solution for preventing the downlink interference signal 34 from leaking into the uplink path 40 is to employ high isolation RF filters (e.g., cavity filters) in the coupling device 36. However, the high isolation RF filters may lead to significant cost increase of the RAU 32. Hence, it may be desirable to preserve signal integrity in the uplink path 40 without employing high cost high isolation RF filters in the RAU 32.

Figure 3:
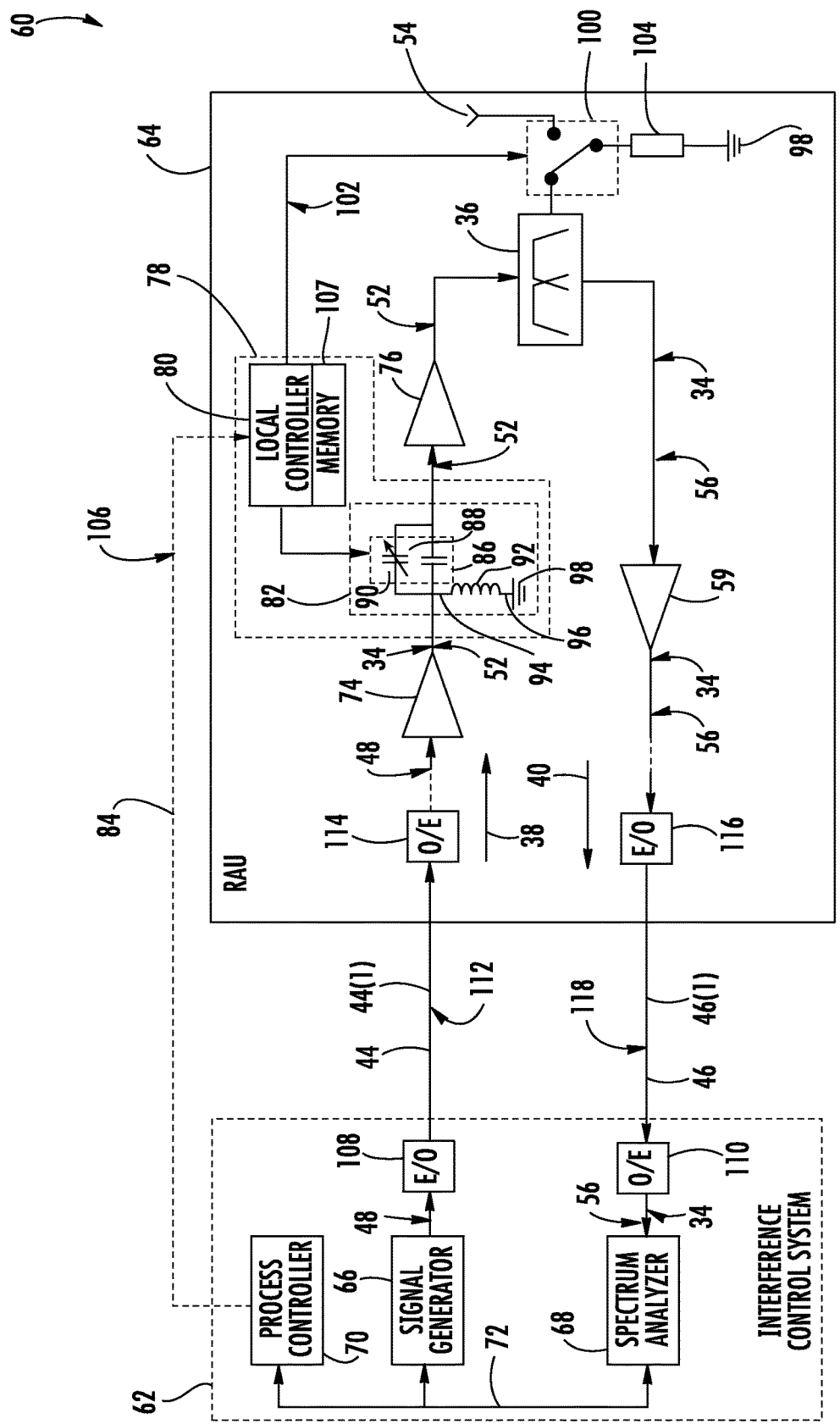
FIG. 3 is a schematic diagram of an exemplary DAS comprising an interference control system configured to measure and reduce the downlink interference signal leaked from the downlink path of the RAU in FIG. 2 to the uplink path of the RAU to a minimal level.

In this regard, FIG. 3 is a schematic diagram of an exemplary DAS 60 comprising an interference control system 62 configured to measure and reduce the downlink interference signal 34 of FIG. 2 leaked from the downlink path 38 to the uplink path 40 of at least one RAU 64 in the DAS 60 to a minimal level, thus preserving signal integrity in the uplink path 40 in the RAU 64. Common elements between FIGS. 2 and 3 are shown therein with common element numbers and thus will not be re-described.

With reference to FIG. 3, the interference control system 62 comprises a signal generator 66, a spectrum analyzer 68, and a process controller 70. In a non-limiting example, the process controller 70 may be a microprocessor, a micro-controller, a field programmable gate array (FPGA), or other circuitry that can be configured to reduce the downlink interference signal 34 leaked from the downlink path 38 to the uplink path 40 of the RAU 64. The signal generator 66 is communicatively coupled to the RAU 64 over the downlink communications medium 44. The spectrum analyzer 68 is communicatively coupled to the RAU 64 over the uplink communications medium 46. Additionally, the signal generator 66, the spectrum analyzer 68, and the process controller 70 may be communicatively coupled by an internal communication link 72. As will be discussed in more detail below, the signal generator 66 is configured to provide the downlink communications signal 48 to the RAU 64, and the spectrum analyzer 68 is configured to measure the downlink interference signal 34 in the uplink signal 56.

With continuing reference to FIG. 3, the RAU 64 comprises a first downlink signal amplifier 74 and a second downlink signal amplifier 76 disposed according to a serial arrangement in the downlink path 38 before the coupling device 36. The first downlink signal amplifier 74 and the second downlink signal amplifier 76 are provided in the RAU 64 to ensure that the downlink signal 52 is amplified adequately to desired signal strength. The RAU 64 also comprises an adjustment circuit 78. The adjustment circuit 78 comprises a local controller 80 and an adjustable matching circuit 82. The local controller 80 is configured to be controlled by the process controller 70 to improve linearity of the first downlink signal amplifier 74 and thus, reduce the downlink interference signal 34. The local controller 80 may be a microprocessor, micro-controller, field programmable gate array (FPGA), or other circuitry that can be configured to reduce the downlink interference signal 34. The local controller 80 is communicatively coupled to the process controller 70 in the interference control system 62 by a communication link 84. In a non-limiting example, the communication link 84 may be a dedicated serial communication cable or a dedicated Ethernet communication cable.

In another non-limiting example, the communication link 84 may be provided over the downlink communications medium 44.

With continuing reference to FIG. 3, the adjustable matching circuit 82 is disposed between the first downlink signal amplifier 74 and the second downlink signal amplifier 76. According to previous discussions regarding FIG. 2, when the downlink communications signal 48 is amplified, the downlink interference signal 34 may be generated in the downlink signal 52 due to non-linearities of the first downlink signal amplifier 74 and the second downlink signal amplifier 76. In this regard, by disposing the adjustable matching circuit 82 after the first downlink signal amplifier 74, it is possible to improve the linearity of the first downlink signal amplifier 74, thus suppressing the downlink interference signal 34 in the downlink signal 52. Further, by disposing the adjustable matching circuit 82 before the second downlink signal amplifier 76, it is possible to compensate for insertion loss introduced by the adjustable matching circuit 82 to ensure that the downlink signal 52 is amplified adequately to the desired signal strength.

With continuing reference to FIG. 3, in a non-limiting example, the adjustable matching circuit 82 may be an LC matching circuit. The adjustable matching circuit 82 comprises a capacitor circuit 86. The capacitor circuit 86 comprises a capacitor 88 and an adjustable capacitor 90 disposed according to a parallel arrangement. The adjustable capacitor 90 comprises a plurality of capacitance values. In a non-limiting example, the adjustable capacitor 90 may be set to thirty-two (32) different capacitance values. As such, by setting the adjustable capacitor 90 to a capacitance value among the plurality of capacitance values, it is possible to change the capacitance value of the adjustable matching circuit 82. The adjustable matching circuit 82 also comprises an inductor 92, which has a first end 94 coupled to the first downlink signal amplifier 74 before the capacitor circuit 86 and a second end 96 coupled to a ground 98. The capacitor circuit 86 and the inductor 92 are used to obtain a conjugate impedance match with the first downlink signal amplifier 74, thus improving the linearity of the first downlink signal amplifier 74. In this regard, it is possible to control the adjustable matching circuit 82 by adjusting the adjustable capacitor 90 to minimize the downlink interference signal 34 in the downlink path 38, therefore reducing the downlink interference signal 34 leaked into the uplink path 40.

With continuing reference to FIG. 3, the RAU 64 also comprises a switch 100 that is disposed between the coupling device 36 and the antenna 54. The local controller 80 may control the switch 100 to couple the coupling device 36 to the antenna 54 or decouple the coupling device 36 from the antenna 54 by providing a switch control signal 102 to the switch 100. When the coupling device 36 is coupled to the antenna 54 by the switch 100, the RAU 64 is in an operating mode operation. In contrast, when the coupling device 36 is decoupled from the antenna 54 by the switch 100, the RAU 64 is in a commissioning mode operation. In a non-limiting example, the coupling device 36 may be coupled to the ground 98 by a resistor 104. In another non-limiting example, the resistor 104 has a resistance of fifty ohms (50Ω). When the RAU 64 is in the commissioning mode operation, the RAU 64 will not be able to receive the uplink communications signal 58 from the one or more client devices as the antenna 54 is decoupled. As such, the uplink signal 56 will only include the downlink interference signal 34 leaked from the downlink path 38 by the coupling device 36.

In this regard, to minimize the downlink interference signal 34 leaked into the uplink path 40 of the RAU 64, the process controller 70 in the interference control system 62 first configures the RAU 64 for the commissioning mode operation by providing an adjustment control signal 106 to the local controller 80 in the RAU 64 over the communication link 84. In a non-limiting example, the adjustment control signal 106 is indicative of matching circuit adjustment. In response to receiving the adjustment control signal 106 indicative of matching circuit adjustment, the local controller 80 provides the switch control signal 102 to the switch 100 to decouple the coupling device 36 from the antenna 54, thus configuring the RAU 64 for the commissioning mode operation. Next, the process controller 70 uses the internal communication link 72 to instruct the signal generator 66 to provide the downlink communications signal 48 to the downlink path 38 of the RAU 64 over the downlink communications medium 44. In a non-limiting example, the downlink communications signal 48 may be a test signal that occupies the same 1930 MHz-1950 MHz band as the downlink communications signal 48 occupies when the RAU 64 is in the operating mode operation.

With continuing reference to FIG. 3, the spectrum analyzer 68 in the interference control system 62 receives the uplink signal 56 over the uplink communications medium 46. As mentioned above, the uplink signal 56 now only includes the downlink interference signal 34 leaked from the downlink path 38 because the RAU 64 has been configured for the commissioning mode operation. The spectrum analyzer 68 measures the signal strength of the downlink interference signal 34 received from the RAU 64 and provides the measured signal strength to the process controller 70 over the internal communication link 72.

The process controller 70 receives the measured signal strength of the downlink interference signal 34 from the spectrum analyzer 68. If the measured signal strength indicates that the downlink interference signal 34 is not minimized, the process controller 70 provides the adjustment control signal 106 indicative of matching circuit adjustment to the local controller 80. In response to receiving the adjustment control signal 106 indicative of matching circuit adjustment, the local controller 80 sets the adjustable capacitor 90 to a capacitance value, which is selected from the plurality of capacitance values of the adjustable capacitor 90 and is different from a present capacitance value of the adjustable capacitor 90. By setting the adjustable capacitor 90 to a different capacitance value, the linearity of the first downlink signal amplifier 74 is changed. Hence, another signal strength measurement of the downlink interference signal 34 can be taken by the spectrum analyzer 68 and provided to the process controller 70. In a non-limiting example, it is possible for the local controller 80 to sweep all of the plurality of capacitance values of the adjustable capacitor 90 to minimize the downlink interference signal 34.

In a non-limiting example, if the measured signal strength indicates that the downlink interference signal 34 is minimized, the process controller 70 provides the adjustment control signal 106 indicative of matching circuit settlement to the local controller 80. In response to receiving the adjustment control signal 106 indicative of matching circuit settlement, the local controller 80 stores the present capacitance value of the adjustable capacitor 90 as a preferred capacitance value in a local storage media 107. In a non-limiting example, the local storage media 107 may be Non-volatile Random Access Memory (NVRAM), Universal Flash Storage (UFS), embedded Multimedia Card (eMMC), and so on. The local controller 80 then provides the switch control signal 102 to the switch 100 to configure the RAU 64 for the operating mode operation based on the preferred capacitance value stored in the local storage media 107. Hence, by repeatedly adjusting the capacitance value of the adjustable capacitor 90 based on the measured signal strength of the downlink interference signal 34, it is possible to minimize the downlink interference signal 34 in the uplink path 40 of the RAU 64.

With continuing reference to FIG. 3, in a non-limiting example, the downlink communications medium 44 may be at least one optical fiber-based downlink communications medium 44(1). Likewise, the uplink communications medium 46 may be at least one optical fiber-based uplink communications medium 46(1). In this regard, an electrical-to-optical (E/O) converter 108 is disposed between the signal generator 66 and the optical fiber-based downlink communications medium 44(1). Likewise, an optical-to-electrical (O/E) converter 110 is disposed between the spectrum analyzer 68 and the optical fiber-based uplink communications medium 46(1). The E/O converter 108 converts the downlink communications signal 48 to an optical downlink communications signal 112 for distribution to the RAU 64. The RAU 64 comprises a second O/E converter 114 for converting the optical downlink communications signal 112 back to the downlink communications signal 48. The RAU 64 also comprises a second E/O converter 116 for converting the uplink signal 56 to an optical uplink signal 118 for distribution to the interference control system 62. The O/E converter 110 in the interference control system 62 subsequently converts the optical uplink signal 118 back to the uplink signal 56. In a non-limiting example, the optical fiber-based downlink communications medium 44(1) and the optical fiber-based uplink communications medium 46(1) may be provided as a single optical fiber. In this regard, the optical downlink communications signal 112 and the optical uplink signal 118 may be communicated over the single optical fiber via wavelength division multiplexing (WDM).

Figure 4:
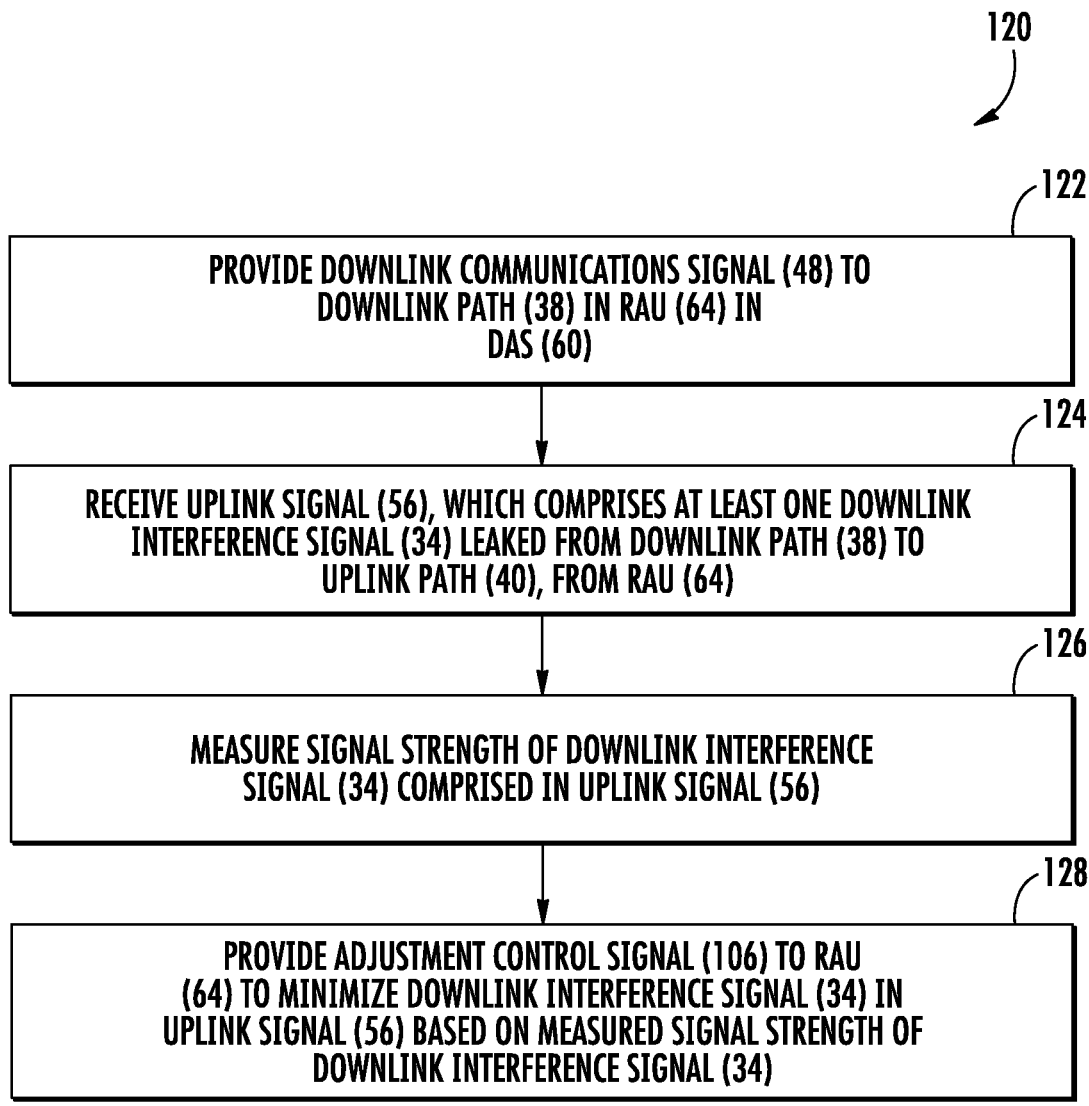
FIG. 4 is a flowchart of an exemplary interference reduction process for reducing the downlink interference signal in the uplink path of the RAU in the DAS in FIG. 3.

FIG. 4 is a flowchart of an exemplary interference reduction process 120 for reducing the downlink interference signal 34 in the uplink path 40 of the RAU 64 of FIG. 3.

With reference to FIG. 4, prior to starting the interference reduction process 120, the interference control system 62 may optionally configure the RAU 64 for the commissioning mode operation. The interference control system 62 provides the downlink communications signal 48 to the downlink path 38 in the RAU 64 of the DAS 60 (block 122). Next, the interference control system 62 receives the uplink signal 56, which comprises the downlink interference signal 34 leaked from the downlink path 38 to the uplink path 40, from the RAU 64 (block 124). The interference control system 62 then measures the signal strength of the downlink interference signal 34 comprised in the uplink signal 56 (block 126). Subsequently, the interference control system 62 provides the adjustment control signal 106 to the RAU 64 to minimize the downlink interference signal 34 in the uplink signal 56 based on the measured signal strength of the downlink interference signal 34 (block 128). Once the downlink interference signal 34 is minimized, the interference control system 62 may configure the RAU 64 for the operating mode operation.

Figure 5:
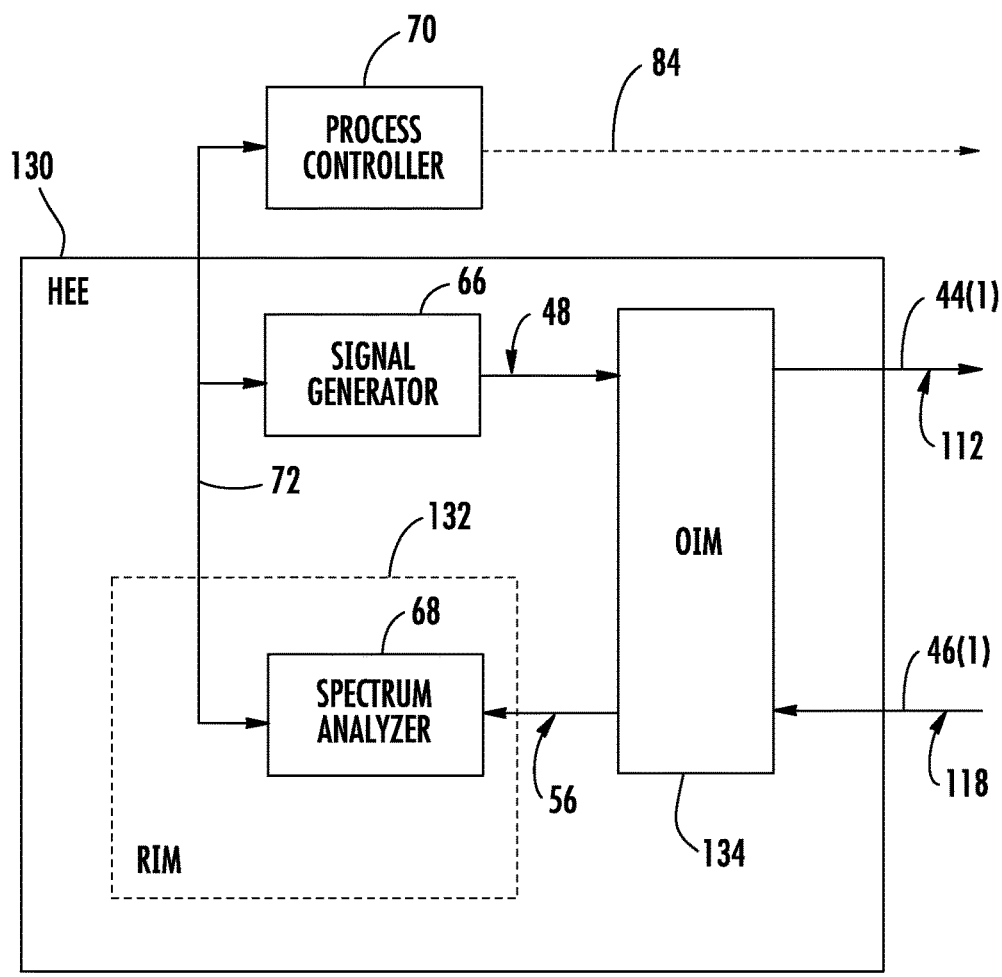
FIG. 5 is a schematic diagram of an exemplary HEE, wherein the interference control system of FIG. 3 may be provided.

With reference back to FIG. 3, the interference control system 62 is provided outside of the RAU 64. In this regard, the interference control system 62 may be configured flexibly to measure and reduce the downlink interference signal 34 in any RAU (not shown) in the DAS 60 to the minimal level. In a non-limiting example, the interference control system 62 of FIG. 3 may be provided in an HEE, or any intermediate equipment located between the HEE and the RAU 64, in the DAS 60. In this regard, FIG. 5 is a schematic diagram of an exemplary HEE 130, wherein the interference control system 62 of FIG. 3 may be provided. Common elements between FIGS. 3 and 5 are shown therein with common element numbers and will not be re-described herein.

With reference to FIG. 5, the HEE 130 comprises a radio interface module (RIM) 132 and an optical interface module (OIM) 134. The OIM 134 may comprise the E/O converter 108 (not shown) and the O/E converter 110 (not shown) of FIG. 3. In a first non-limiting example, the spectrum analyzer 68 may be provided between the RIM 132 and the OIM 134. In a second non-limiting example, the spectrum analyzer 68 may be provided inside the RIM 132. In a third non-limiting example, the signal generator 66 may be provided inside the RIM 132. In a fourth non-limiting example, the process controller 70 may be provided inside the HEE 130.

Figure 6:
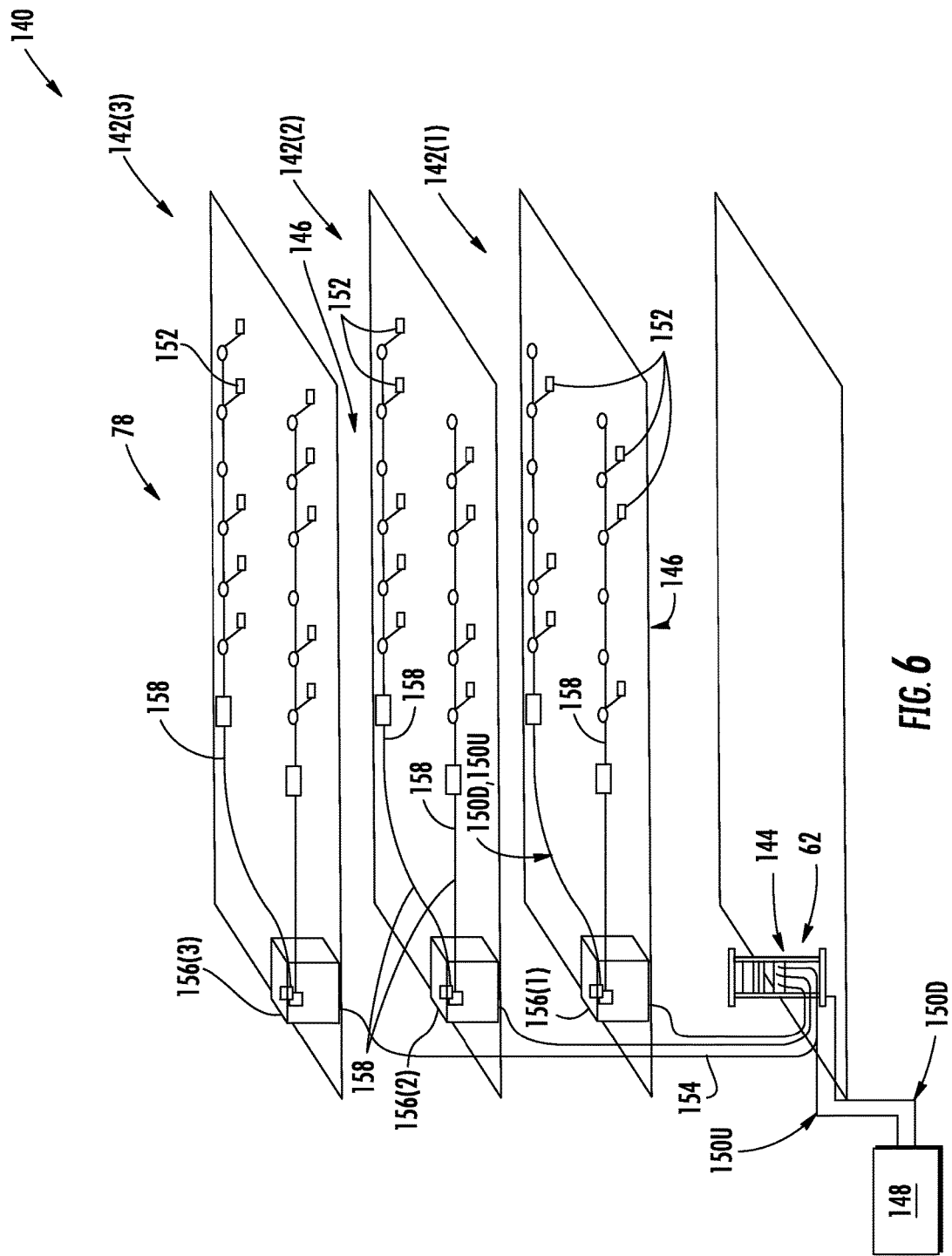
FIG. 6 is a partial schematic cut-away diagram of an exemplary building infrastructure in which the interference control system and an adjustment circuit in the RAU of FIG. 3 can be employed.

The interference control system 62 and the adjustment circuit 78 of FIG. 3 may be provided in an indoor environment, as illustrated in FIG. 6. FIG. 6 is a partial schematic cut-away diagram of an exemplary building infrastructure 140 in which the interference control system 62 and the adjustment circuit 78 of FIG. 3 can be employed. The building infrastructure 140 in this embodiment includes a first (ground) floor 142(1), a second floor 142(2), and a third floor 142(3). The floors 142(1)-142(3) are serviced by a central unit 144 to provide antenna coverage areas 146 in the building infrastructure 140. In a non-limiting example, the interference control system 62 may be provided in the central unit 144. The central unit 144 is communicatively coupled to a base station 148 to receive downlink communications signals 150D from the base station 148. The central unit 144 is communicatively coupled to RAUs 152 to receive uplink communications signals 150U from the RAUs 152, as previously discussed above. The downlink communications signals 150D and the uplink communications signals 150U communicated between the central unit 144 and the RAUs 152 are carried over a riser cable 154. In another non-limiting example, the adjustment circuit 78 may be provided in the RAUs 152. The riser cable 154 may be routed through interconnect units (ICUs) 156(1)-156(3) dedicated to each of the floors 142(1)-142(3) that route the downlink communications signals 150D and the uplink communications signals 150U to the RAUs 152 and also provide power to the RAUs 152 via array cables 158.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A distributed antenna system (DAS), comprising:
a head-end equipment (HEE) communicatively coupled to a plurality of remote antenna units (RAUs) over at least one downlink communications medium and at least one uplink communications medium;
wherein at least one RAU among the plurality of RAUs comprises a coupling device coupled to a downlink path configured to carry a downlink signal and an uplink path configured to carry an uplink signal, the coupling device configured to:
receive the downlink signal from the downlink path and provide the downlink signal to an antenna, wherein the downlink signal comprises at least one downlink communications signal and at least one downlink interference signal; and
provide the uplink signal to the uplink path, wherein the uplink signal comprises an uplink communications signal received from the antenna and the at least one downlink interference signal leaked from the downlink path to the uplink path; and
an interference control system communicatively coupled to the at least one RAU among the plurality of RAUs, the interference control system configured to:
provide the at least one downlink communications signal to the at least one RAU over the at least one downlink communications medium;
receive the uplink signal from the at least one RAU over the at least one uplink communications medium;
measure signal strength of the at least one downlink interference signal comprised in the uplink signal; and
generate and provide an adjustment control signal to an adjustment circuit in the at least one RAU to reduce the at least one downlink interference signal in the uplink signal to a minimal level based on the measured signal strength of the at least one downlink interference signal.

2. The DAS of claim 1, wherein:
the at least one downlink communications medium is comprised of at least one optical fiber-based downlink communications medium; and
the at least one uplink communications medium is comprised of at least one optical fiber-based uplink communications medium.

3. The DAS of claim 2, wherein the at least one optical fiber-based downlink communications medium and the at least one optical fiber-based uplink communications medium are provided in a same optical fiber.

4. The DAS of claim 1, wherein the adjustment circuit comprises a local controller configured to suppress the at least one downlink interference signal in the downlink signal based on the adjustment control signal.

5. The DAS of claim 4, wherein the interference control system comprises:
a signal generator configured to generate and distribute the at least one downlink communications signal to the at least one RAU over the at least one downlink communications medium;
a spectrum analyzer configured to:
receive the uplink signal from the at least one RAU over the at least one uplink communications medium; and
measure the signal strength of the at least one downlink interference signal comprised in the uplink signal; and a process controller communicatively coupled to the signal generator, the spectrum analyzer, and the adjustment circuit in the at least one RAU, the process controller configured to:
configure the at least one RAU for a commissioning mode operation by providing an adjustment control signal indicative of matching circuit adjustment;
instruct the signal generator to provide the downlink signal to the at least one RAU;
receive the measured signal strength of the at least one downlink interference signal from the spectrum analyzer;
provide the adjustment control signal indicative of matching circuit adjustment if the measured signal strength indicates that the at least one downlink interference signal is not minimized; and
provide an adjustment control signal indicative of matching circuit settlement if the measured signal strength indicates that the at least one downlink interference signal is minimized.

6. The DAS of claim 5, wherein the process controller is communicatively coupled to the adjustment circuit in the at least one RAU over a dedicated serial communication cable.

7. The DAS of claim 5, wherein the process controller is communicatively coupled to the adjustment circuit in the at least one RAU over a dedicated Ethernet communication cable.

8. The DAS of claim 5, wherein the process controller is communicatively coupled to the adjustment circuit in the at least one RAU over the at least one downlink communications medium.

9. The DAS of claim 5, wherein the at least one RAU among the plurality of RAUs further comprises a first downlink signal amplifier and a second downlink signal amplifier disposed in a serial arrangement in the downlink path.

10. The DAS of claim 9, wherein the adjustment circuit in the at least one RAU comprises an adjustable matching circuit disposed between the first downlink signal amplifier and the second downlink signal amplifier, the adjustable matching circuit comprising:
a capacitor circuit disposed between the first downlink signal amplifier and the second downlink signal amplifier, the capacitor circuit comprising a capacitor and an adjustable capacitor disposed in a parallel arrangement; and
an inductor comprising a first end coupled to the first downlink signal amplifier before the capacitor circuit and a second end coupled to a ground.

11. The DAS of claim 10, wherein the local controller is communicatively coupled to the process controller in the interference control system, the local controller configured to:
set the adjustable capacitor to a capacitance value among a plurality of capacitance values of the adjustable capacitor in response to receiving the adjustment control signal indicative of matching circuit adjustment, wherein the capacitance value is different from a present capacitance value of the adjustable capacitor; and
store the present capacitance value of the adjustable capacitor as a preferred capacitance value in a local storage media in response to receiving the adjustment control signal indicative of matching circuit settlement.

12. The DAS of claim 11, wherein the at least one RAU further comprises a switch disposed between the coupling device and the antenna, the switch configured to be controlled by the local controller to couple the coupling device to the antenna or decouple the coupling device from the antenna.

13. The DAS of claim 5, wherein the local controller is further configured to configure the at least one RAU for the commissioning mode operation in response to receiving the adjustment control signal indicative of matching circuit adjustment by controlling a switch to decouple the coupling device from the antenna.

14. The DAS of claim 5, wherein the local controller is further configured to configure the at least one RAU for an operating mode operation in response to receiving the adjustment control signal indicative of matching circuit settlement by controlling a switch to couple the coupling device to the antenna.

15. A head-end equipment (HEE) in a distributed antenna system (DAS), comprising:
a signal generator coupled to at least one remote antenna unit (RAU) among a plurality of RAUs in a DAS over at least one downlink communications medium, the signal generator configured to generate and distribute at least one downlink communications signal to a downlink path in the at least one RAU over the at least one downlink communications medium; and
a spectrum analyzer coupled to the at least one RAU over at least one uplink communications medium, the spectrum analyzer configured to:
receive an uplink signal from an uplink path in the at least one RAU over the at least one uplink communications medium, wherein the uplink signal comprises at least one downlink interference signal leaked from the downlink path to the uplink path in the at least one RAU;
measure signal strength of the at least one downlink interference signal comprised in the uplink signal; and
provide the measured signal strength of the at least one downlink interference signal to a process controller that is communicatively coupled to the spectrum analyzer and the signal generator; and
wherein the process controller is configured to provide an adjustment control signal to the at least one RAU to minimize the at least one downlink interference signal in the uplink signal based on the measured signal strength of the at least one downlink interference signal.

16. The HEE of claim 15, wherein the process controller is configured to provide the adjustment control signal to the at least one RAU over a dedicated serial communication cable.

17. The HEE of claim 15, wherein the process controller is configured to provide the adjustment control signal to the at least one RAU over a dedicated Ethernet communication cable.

18. The HEE of claim 15, wherein the process controller is configured to provide the adjustment control signal to the at least one RAU over the at least one downlink communications medium.

19. The HEE of claim 15, wherein:
the at least one downlink communications medium is comprised of at least one optical fiber-based downlink communications medium; and
the at least one uplink communications medium is comprised of at least one optical fiber-based uplink communications medium.

20. The HEE of claim 19, further comprising:
an electrical-to-optical (E/O) converter disposed between the signal generator and the at least one optical fiber-based downlink communications medium, the E/O converter configured to convert the at least one downlink communications signal to an optical downlink communications signal; and
an optical-to-electrical (O/E) converter disposed between the spectrum analyzer and the at least one optical fiber-based uplink communications medium, the O/E converter configured to convert an optical uplink signal into the uplink signal.

21. A remote antenna unit (RAU) in a distributed antenna system (DAS), comprising:
a coupling device coupled to a downlink path and an uplink path, the coupling device configured to:
receive a downlink signal from the downlink path and provide the downlink signal to an antenna, wherein the downlink signal comprises at least one downlink communications signal and at least one downlink interference signal;
provide an uplink signal to the uplink path, wherein the uplink signal comprises an uplink communications signal received from the antenna and the at least one downlink interference signal leaked from the downlink path to the uplink path; and
an adjustment circuit comprising a local controller communicatively coupled to a process controller in an interference reduction control system, the local controller configured to suppress the at least one downlink interference signal in the downlink signal based on an adjustment control signal received from the interference reduction control system that is communicatively coupled to the adjustment circuit; and
a first downlink signal amplifier and a second downlink signal amplifier disposed according to a serial arrangement in the downlink path before the coupling device, wherein the adjustment circuit comprises an adjustable matching circuit disposed between the first downlink signal amplifier and the second downlink signal amplifier, the adjustable matching circuit comprising:
a capacitor circuit disposed between the first downlink signal amplifier and the second downlink signal amplifier, the capacitor circuit comprising a capacitor and an adjustable capacitor disposed in a parallel arrangement; and
an inductor comprising a first end coupled to the first downlink signal amplifier before the capacitor circuit and a second end coupled to a ground.

22. The RAU of claim 21, wherein the local controller is configured to:
set the adjustable capacitor to a capacitance value among a plurality of capacitance values of the adjustable capacitor in response to receiving an adjustment control signal indicative of matching circuit adjustment, wherein the capacitance value is different from a present capacitance value of the adjustable capacitor; and
store the present capacitance value of the adjustable capacitor as a preferred capacitance value in a local storage media in response to receiving an adjustment control signal indicative of matching circuit settlement.

23. The RAU of claim 22, further comprising a switch disposed between the coupling device and the antenna, wherein the switch is controlled by the local controller to couple the coupling device to the antenna or decouple the coupling device from the antenna.

24. The RAU of claim 23, wherein the local controller is further configured to configure an RAU for a commissioning mode operation by controlling the switch to decouple the coupling device from the antenna.

25. The RAU of claim 23, wherein the local controller is further configured to configure an RAU for an operating mode operation by controlling the switch to couple the coupling device to the antenna.

* * * * *